United States Patent [19]

Steele

[11] 4,422,738
[45] Dec. 27, 1983

[54] HAND-HELD MAP VIEWER AND NAVIGATIONAL AID

[76] Inventor: Daniel W. Steele, 2 Sherwood Cir., Clay, N.Y. 13041

[21] Appl. No.: 229,232

[22] Filed: Jan. 28, 1981

Related U.S. Application Data

[63] Continuation-in-part of Ser. No. 41.648, May 23, 1979, abandoned.

[51] Int. Cl.³ .............................................. G03B 21/00
[52] U.S. Cl. ...................................... 353/11; 350/241
[58] Field of Search ..................................... 353/11–14, 353/42, 44; 33/1 SD; 350/238, 239, 241, 243; 40/363–367, 361, 362, 904, 518

[56] References Cited

U.S. PATENT DOCUMENTS

| | | | |
|---|---|---|---|
| 2,267,649 | 12/1941 | Graves | 353/12 |
| 2,503,550 | 4/1950 | Food | 353/12 |
| 4,094,589 | 6/1978 | Brown | 350/241 |
| 4,149,783 | 4/1979 | Latady | 353/11 |

FOREIGN PATENT DOCUMENTS

| | | | |
|---|---|---|---|
| 42008 | 2/1917 | Sweden | 350/241 |
| 324395 | 1/1930 | United Kingdom | 353/12 |

Primary Examiner—Harry N. Haroian
Attorney, Agent, or Firm—Charles S. McGuire

[57] ABSTRACT

A hand-held navigational tool including one or more maps, preferably in the form of photograhic transparencies, releasably mounted upon a base for viewing through an opening in the base and rotatable about the center of the opening relative to course bearing indicia carried on a transparent graticule which is superposed with the viewed portion of the map. The viewer is carried on a member movably linearly in any direction in a plane parallel to that of the map to allow magnified viewing of a portion of the map while permitting visual excursion over the entire map. A compass, relative distance scales, map illumination means and selectively operable means for scribing a course line in the map holder or rotating the viewed portion of the map about a fixed point are all additional features which may be incorporated in the unit.

19 Claims, 8 Drawing Figures

HAND-HELD MAP VIEWER AND NAVIGATIONAL AID

REFERENCE TO RELATED APPLICATION

This is a continuation-in-part of U.S. application Ser. No. 41,648, filed May 23, 1979, now abandoned.

BACKGROUND OF THE INVENTION

The present invention relates to navigational aids and, more specifically, to hand-held units containing a map with means for visually performing navigational tasks such as setting and maintaining a desired course, position tracking, relative bearing indication, and the like.

The prior art includes various examples of relatively small and simple navigational aids for holding and displaying maps, as well as assisting in various operations such as those mentioned in the preceding paragraph. For example, U.S. Pat. Nos. 4,149,783, 3,844,041, 3,805,429, 3,094,781 and 2,210,773 disclose apparatus of this general type. In each case, however, certain limitations preclude use of the disclosed apparatus as an effective tool for performing at least some of the more common and necessary navigational tasks.

It is a principal object of the present invention to provide, in a relatively small, simple and inexpensive, hand-held device, a complete navigational tool which assists and simplifies all functions associated with navigation by map and compass.

A further object is to provide a highly portable, yet accurate and efficient navigational tool for visually scanning magnified portions of a size-reduced map.

Another object is to provide a position display and tracking device for hand-held viewing and operation wherein a viewed map scene accurately depicts surrounding objects in relation to present position, orientation and course.

Still further objects are to provide a convenient, light weight, small dimensioned navigational tool having the following attributes and capabilities: high viewing resolution, allowing the use of photo-reduced maps without loss of detail or utility; means for locating coordinates of various features on a map for future reference; and, means for easily measuring distances between points.

Other objects will in part be obvious and will in part appear hereinafter.

SUMMARY OF THE INVENTION

In accordance with the foregoing objects, the invention is disclosed in embodiments constructed almost entirely of plastic, having maximum external dimensions on the order of 4"×6"×1½", thus being suitable for shirt-pocket carrying. The device includes a base with a circular opening or viewport wherein a map holder, carrying a photographic transparency of a map, is removably mounted. The term "map" as used throughout the present disclosure, is broadly used to denote one or more charts, photographs, and other relevant navigational, topographical and geographical representations.

An angular scale is provided on the map holder in fixed relation to the map for indicating a course bearing angle adjacent a scribe mark on the base when the map is oriented along the desired line of travel.

A first slide member is mounted upon the base for reciprocal movement in a linear direction perpendicular to the central axis of the viewport. A second slide member is mounted upon the first for movement therewith and also for reciprocal movement relative thereto in a direction mutually perpendicular to the viewport axis and the direction of movement of the first slide member. The second slide member carries a viewer for traversing the viewport as the slide members are moved along their respective paths. The viewer includes a magnifying lens, preferably mounted for focusing movement relative to the superposed planes of the map and a graticule, comprising a transparent optical plate fixedly mounted with respect to the viewer and visible throughout therethrough at all times. The graticule carries predetermined reference indicia for use in a manner described in detail later in the specification.

The device is employed in conjunction with a magnetic compass. In the preferred embodiment, therefore, such a compass is mounted directly upon the device, being carried on the second slide member adjacent the viewer. Means are provided for locking the relative positions of the base and slide members which allows movement of the viewer to be constrained to a path coincident with course bearing. Various scales, reference marks, etc., are also provided to enhance utility and versatility of the device by calibrating the motion of both slide members and allowing coordinate position measurement.

An embodiment wherein a film strip, or the like, containing a succession of maps for selective movement into viewing position, is also shown and described. A particularly significant embodiment provides the capability for conveniently rotating the viewed map scene about its center, greatly enhancing operation where numerous course changes are required. Other details of construction and operation of the invention will be apparent from the following detailed description, taken in conjunction with the accompanying drawings.

DETAILED DESCRIPTION

Figure 3:
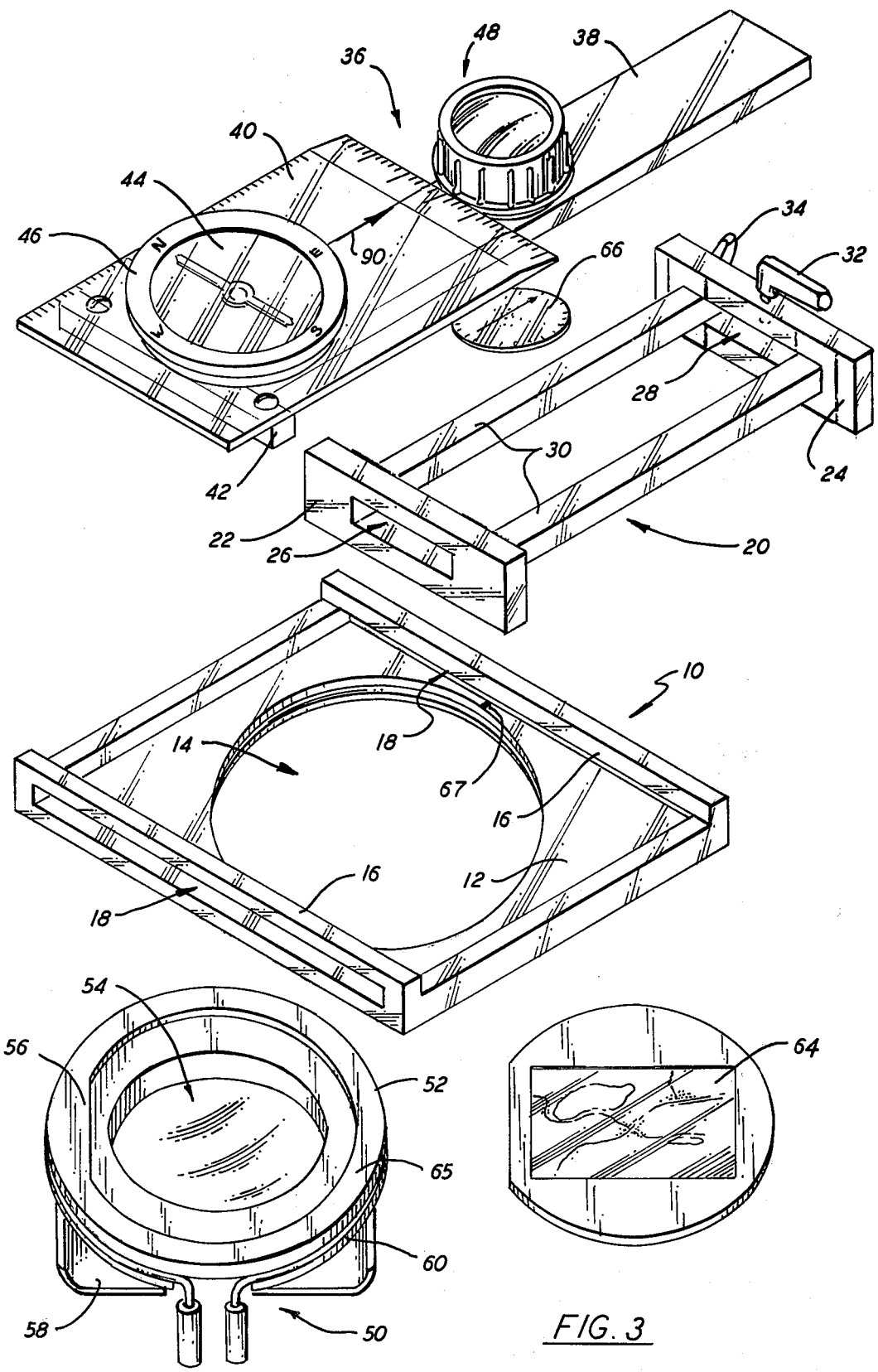
FIG. 3 is an exploded perspective view showing the various individual elements of the device.

Referring now to the drawings, the navigational device of the invention includes a portion designated as the base and indicated generally by reference numeral 10. As best seen in FIG. 3, base 10 includes a square or rectangular plate 12 having a central opening 14 therein. Bars 16 extend along opposite sides of base 10 in spaced relation to plate 12, defining elongated slots 18 therebetween.

A first slide member, generally denoted by reference numeral 20, includes end pieces 22 and 24, having open slots 26 and 28, respectively, therein and connected by rigid bars 30. Locking means in the form of set screws with manually engageable portions 32 and 34 attached thereto extend through threaded openings in end piece 24 for purposes which will be explained later.

Second slide member 36 includes relatively narrow and wide, flat plates 38 and 40, rigidly connected by bar 42 which provides a space between the two plates approximately equal to the thickness of bars 16 and the portion of end piece 22 above slot 26. Conventional magnetic compass 44, having the usual, rotatable bezel 46, is mounted upon plate 40. An eyepiece, generally indicated by reference numeral 48 and described later in more detail, is mounted upon plate 38.

Map holder 50 includes a circular portion 52 having central opening 54 and raised portions 56 defining a recessed area for removably mounting a photographic transparency in covering relation to opening 54. A transluscent plastic plate 58 is attached to circular portion 52 to provide diffuse back lighting for a transparency covering opening 54. Retainer spring 60 encircles circular portion 52, extending slightly outwardly from the periphery thereof in its unflexed condition and compressible by manually pressing end portions 62 together to a position within an annular recess to a smaller circumference than the circular portion.

The individual elements of the device further include map 64, comprising a photographic transparency of an actual map or other navigational representation, carried by a transparency mount for removable placement in map holder 50, the mount and holder being cooperatively shaped for alignment in the necessary relative orientation. An angular scale in the nature of a compass rose 65 is carried on map holder 50 in fixed relation to map 64, either as part of the transparency mount or separate therefrom. Graticule 66, comprising a set of indicia described later in more detail and likewise carried on a photographic transparency, is permanently mounted in covering relation to opening 76 on the lower side of plate 38. As explained later, angular scale 65 is utilized in conjunction with bearing reference line 67 on plate 12 during operation of the device.

Figure 1:
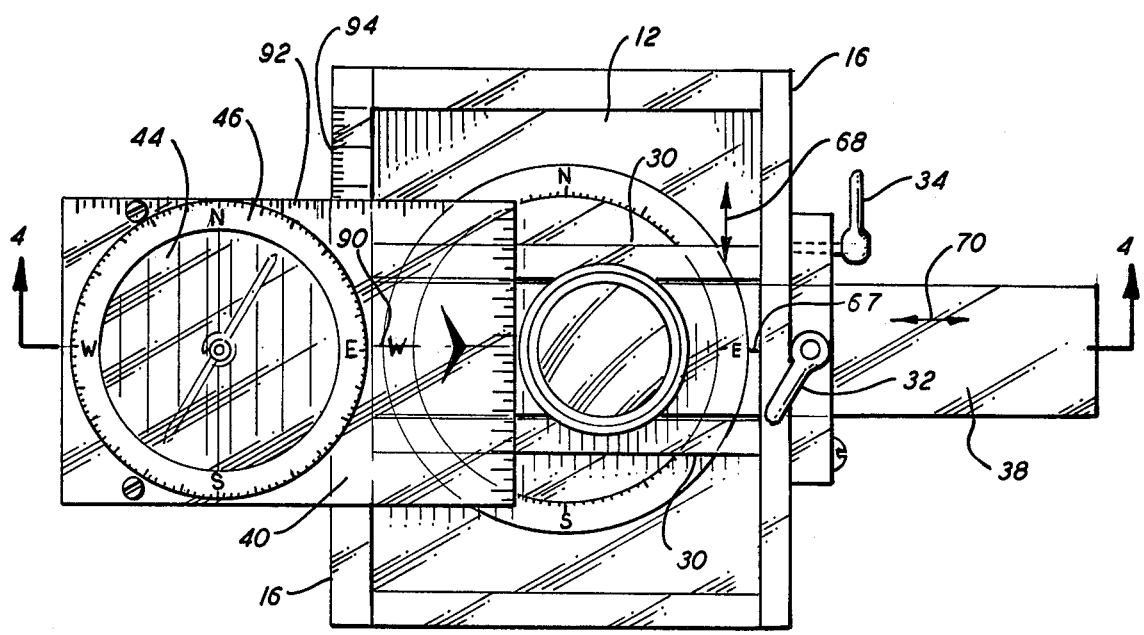
FIGS. 1 and 2 are top and bottom plan views, respectively, of the preferred embodiment.
Figure 2:
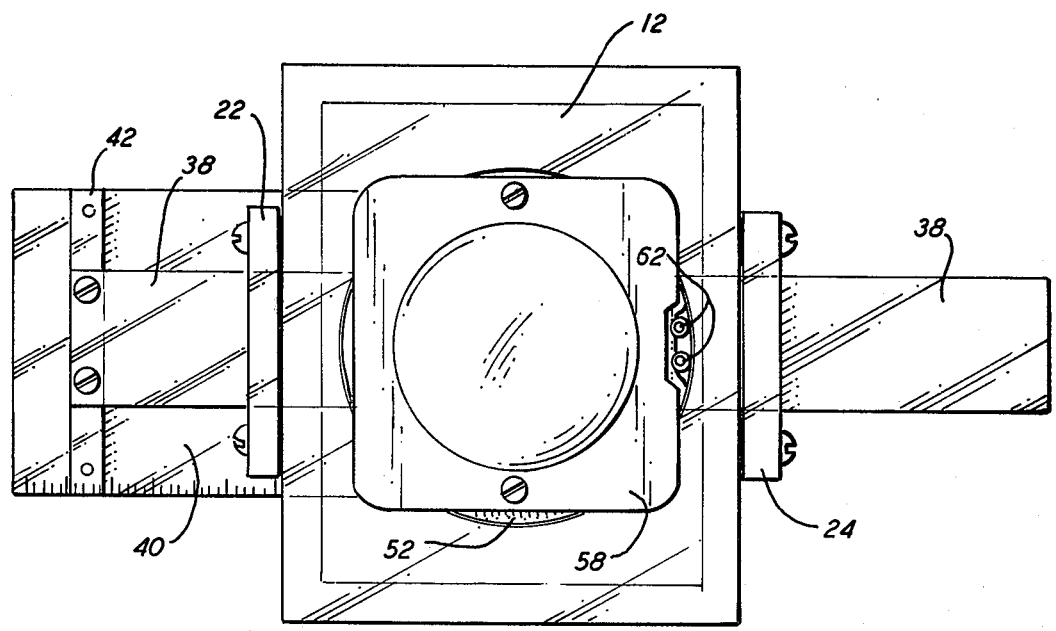
Figure 4:
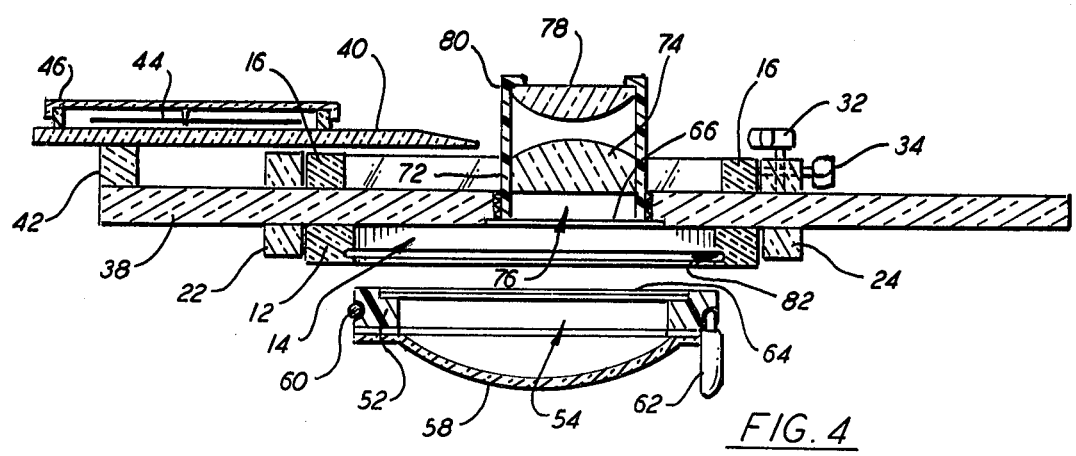
FIG. 4 is an elevational view in section on the line 4—4 of FIG. 1.

When the individual elements are assembled, bars 30 of slide member 20 extend through slots 18 in base 10 with end portions 22 and 24 closely adjacent the sides of the base, as seen in FIG. 4. Dimensions are such that member 20, while in relatively close engagement with base 10, is freely slidable relative thereto in the directions indicated by arrow 68 in FIG. 1. Likewise, second slide member 36 is mounted with plate 38 extending through both of slots 18 in base 10 and slots 26 and 28 in end pieces 22 and 24 of first slide member 20. Thus, a second slide member 36 is movable together with first slide member 20 relative to base 10 in the directions indicated by arrows 68, and is also slidable relative to both the base and first slide member in the directions of arrows 70. From FIGS. 1 and 4 it is readily apparent how the set screws may be advanced and retracted by turning members 32 and 34 to lock the position of the two slide members relative to one another and the position of slide member 20 relative to base 10.

The structure of viewer 48 is seen more clearly in the sectional view of FIG. 4. Lens barrel 72 is fixedly attached to plate 38 with objective 74 covering opening 76 therein. Eyepiece 78 is carried in tube 80 which is threaded or frictionally engaged with barrel 72 to provide relative axial movement and thereby focusing adjustment of the magnifying viewer formed by lenses 74 and 78. The power or degree of magnification may be varied as desired between two or more levels, and/or other types of magnifying viewers such as monoculars, binoculars, microscopes and projectors may be employed.

Map holder 50 is assembled with base 10 by compressing spring 60, inserting central portion 52 into opening 14, and allowing spring 60 to expand into groove 82 thus providing a quick and convenient, releasable, resilient detent means for retaining the map holder in the base. In this position, map 64 is closely superposed with graticule 66 and map holder 50 may be rotated relative to base 10 about the central axis of opening 14. It is also possible to expand spring 60 against the wall of groove 82, thereby locking (i.e., preventing rotation of) map holder 50 with respect to base 10. Dimensions are such that this may be done without interference with movement of slide member 36. The map holder may be removed, and map 64 replaced by another transparency, simply by compressing spring 60 and lifting the map holder away from the base.

Figure 5:
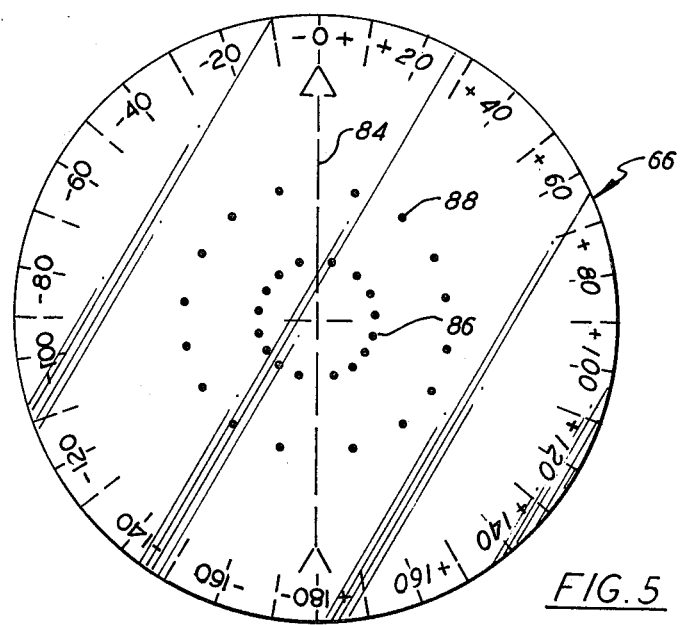
FIG. 5 is an illustrative example of an indicia-bearing portion of the device.

Referring now to FIG. 5, a preferred form of the indicia on graticule 66 is shown. Course track line or arrow 84 extends diametrically across the graticule to indicate the direction of travel and course to be followed across the map surface, as explained later in more detail. The periphery of graticule 66 carries relative bearing markings in degrees from 0 to 180 in both directions (plus and minus) in order to facilitate position location by identification of the bearings of topographic features observed and located on the map relative to the direction of travel. Two concentric rings of dots 86 and 88 may be utilized in estimation of range and relative bearing angles from present position to topographic features.

A typical example of employment of the device in performing a navigational operation will now be described. A photographic transparency of a map which includes the operator's present location and desired final or intermediate destination is selected and mounted on map holder 50. The map holder is then rotatably assembled with base 10 as previously described. While viewing the map through eyepiece 48, slide members 20 and 36 are moved along their respective directions of travel upon base 10, and map holder 50 is rotated as required to traverse visually the portion of the map containing the present location and desired destination and to align the two with course track line 84 on graticule 66.

The bearing angle from present position to destination may then be read from angular scale 65 adjacent the bearing reference line 67. Compass ring 46 is then rotated to place the indicated bearing angle in alignment with the axis of the device, as indicated by scribe line 90 (FIGS. 1 and 3) on plate 40. The entire device is then held in a substantially horizontal plane and rotated as required to align magnetic north bearing on compass ring 46 with the needle of compass 42. The operator may then proceed in a path along the axis of the device. That is, a path in the direction indicated by course track line 84 or scribe line 90, with the device held in the described orientation, will be the correct course from present position to desired destination. The operator, having thus become oriented, views through the viewer a map scene which is in alignment with his current course of travel; that is, what is ahead, behind, to the left and to the right have identical meanings from the viewer's position with respect to both the map and the actual surrounding terrain.

As the course is traveled, slide member 36 may be moved as required in order to traverse visually the course bearing, thus monitoring actual position at any desired time by identifying topographic features actually observed and as shown on the map. As slide member 36 is moved to align the center of graticule 66 with present position, an indication of distance traveled may be obtained from scale 92, with reference to the edge of base 10. Scale 92 may also be utilized in conjunction with scale 94 on base 10 for absolute position location for any predetermined map orientation.

Figure 6:
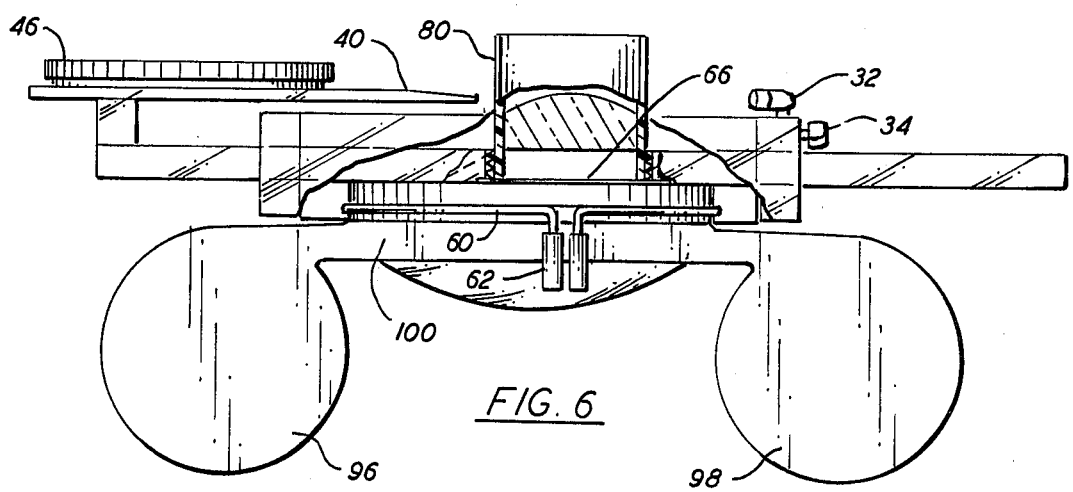
FIG. 6 is a side elevational view, partly in section, of an alternate embodiment.

In FIG. 6 is shown an embodiment wherein any of a plurality of consecutive map transparencies on a continuous film strip may be selectively positioned for viewing. The film strip is contained in a cassette for transfer to and from reels in compartments 96 and 98 in conventional manner by manual manipulation of any desired winding mechanism (not shown) to form a multiple map holder. An appropriate opening or window in central portion 100 permits viewing of the film frame positioned in the window through viewer 48. The cassette may be releasably retained in assembled engagement with base 10 and rotated relative thereto in the same manner as the single map holder previously described. It is possible, of course, to provide means for releasably joining the map holder and base which are not resilient detent means such as the circular spring and groove, while still providing rotation of the map relative to the base.

Figure 7:
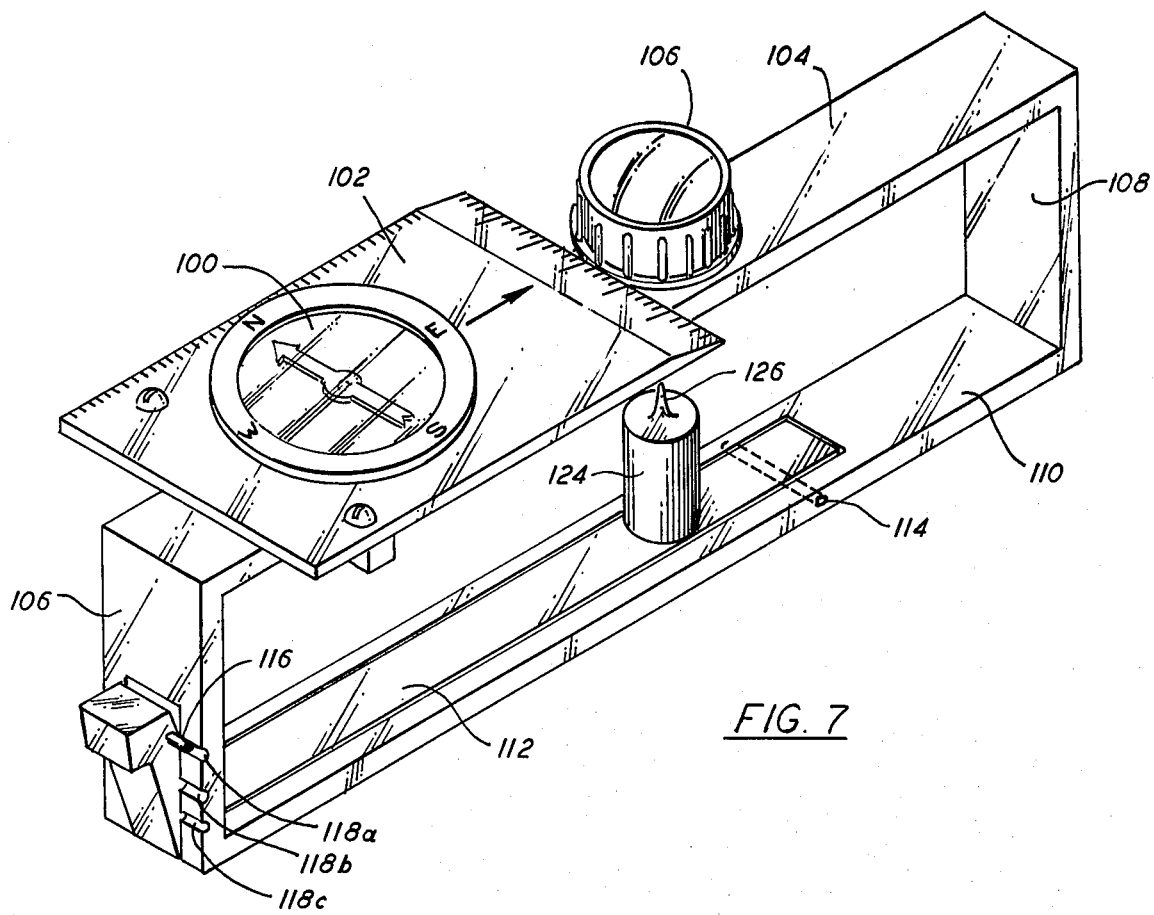
FIG. 7 is a perspective view showing certain elements of still another embodiment.
Figure 8:
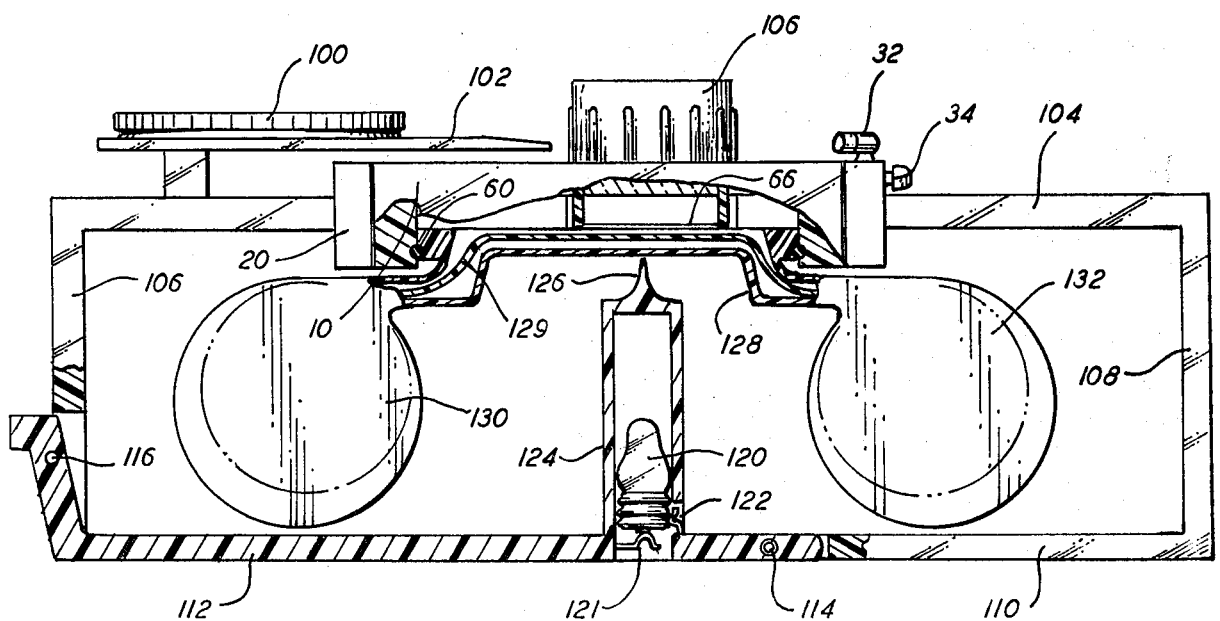
FIG. 8 is a side elevational view, partly in section, of the elements of FIG. 7 assembled with other elements of this embodiment.

A further embodiment is illustrated in FIGS. 7 and 8, to which reference is now made. Base 10 and first slide member 20 may be constructed identically to the same elements of the previously described embodiments and are therefore denoted by the same reference numerals in FIG. 8 and omitted from FIG. 7 to provide a clearer showing of the added elements. Compass 100 is mounted upon relatively wide, flat plate 102 which in turn is mounted upon relatively narrow plate 104, together with eyepiece 106, as in the previous embodiment. An open, rectangular section is formed by plate 104, end plates 106 and 108, and lower plate 110. Plates 106 and 110 contain a central, contiguous slot wherein member 112 is mounted for limited pivotal movement about pin 114. Rigidly extending from the end of member 112 opposite the pivotal mounting is pin 116 which is biased by the natural resilience of the material of member 112 into engagement with the adjoining surface of end plate 106. As member 112 is moved about its pivotal mounting, pin 116 may be engaged in any one of detent grooves 118a, 118b and 118c.

Electric bulb 120 is connected by contacts 121 and 122 on member 112 near pin 114 to a suitable battery (not shown) and covered by small, cylindrical housing 124 having sharp-ended pointer 126 extending from the upper center in direct alignment with the optical center of viewer 106. The material of housing 124 is transluscent and preferably focusing means, which may be built into bulb 120, are provided so that light from the bulb passes through housing 124 and diffuser 128 to illuminate only that portion of the map which is aligned with the viewing means. Since most portions of the device are transparent, ambient light will be sufficient in most daylight conditions to sufficiently illuminate the map. However, when additional light is required, construction of this embodiment provides the optimum situation of directing focused light only to the area being viewed, regardless of where the map is positioned with respect to the viewer.

This embodiment of the invention is pictured in FIG. 8 with multiple map holder 130 mounted upon base 10 in the same manner as in the previous embodiment, i.e., by means of circular spring 60 engaged in a groove in the wall of the circular opening in base 10. It will be noted that diffuser 128 extends inwardly of map holder 130 to lie in a plane closely adjacent to the portion of film strip 129 which is in position for viewing, for purposes described later. The three relatively movable portions of the device, base 10, first slide member 20 and the second slide member, in this embodiment provided by plate 104, are assembled in the same manner as that previously described to allow linear relative movement in any direction of the viewing means and map in adjacent, parallel planes. Locking members 32 and 34 may be provided as before to releasably lock the elements in any desired position.

The positions of detent grooves 118a, 118b, and 118c are such, relative to the positions and dimensions of other elements that when pin 116 is positioned in groove 118c, the end of pointer 126 is out of contact with diffuser 128. When pin 116 is in groove 118b, the end of pointer 126 is in light contact with diffuser 128 to allow relative movement of the two (i.e., relative movement of base 10 and plate 104) with the sharp end of the pointer making a permanent scribe mark on the diffuser. In this case, both the map and scribe lines on the diffuser are visible through the viewer which may be useful for initial course alignment or for subsequent reference to review a course which has been or may be traveled. All of graticule 66, film strip 129 and diffuser 128 lie in closely adjacent, parallel planes so that the indicia on the graticule, the map and any scribe lines on the diffuser are all clearly visible in superposed relation, being at or near the focal point of viewer 106.

When pin 116 is in groove 118a, the sharp point is driven into the material of the diffuser to provide an axis of precession for the map holder. That is, instead of base 10 and slide members 20 and 36 remaining relatively stationary as map holder 50 is rotated about the center of opening 14, the base and map holder precess about an axis through the center of the viewer with respect to the slide member upon which the viewer is mounted. Thus, the visible portion of the map does not change, but appears to rotate within the field of view, thereby accomplishing course bearing rotation about the center of the field of view. This must, of course, be done with locking members 32 and 34 released since the axis of precession may be off the center of the map holder, and thus of the opening in base 10, causing the latter to move relative to plate 104. The point at which the positions of the viewer and map holder are fixed remains directly on the viewer center line and the visible portion of the map does not change as the map is rotated about the center of opening 14. The described movement may be implemented by mechanism other than a sharp pointer fixedly engaging the diffuser to establish an axis of precession. Member 112 may, of course, be swung about pin 116 to allow removal and replacement of the map holder.

What is claimed is:
1. A self-contained map viewer and navigational aid unit comprising:
 (a) a base member having a circular opening therein;
 (b) a map holder with a map supported therein;
 (c) means for releasably attaching said map holder to said base for rotation about a predetermined axis with said map positioned within said opening;

(d) viewing means through which a portion of said map is visible;

(e) movable means upon which said viewing means is carried, said movable means being mounted for movement relative to said base linearly in any direction in a plane adjacent and parallel to said map to selectively change said visible portion; and (f) means selectively movable into and out of contact with a portion of said map holder to make a visible trace thereon when in contact therewith in response to relative movement of said viewing means and said map holder.

2. The invention according to claim 1 and further including means selectively operable to fix the relative linear positions of said viewing means and said map as said map holder is rotated about said predetermined axis, thereby maintaining said visible portion of said map within the field of said viewing means.

3. The invention according to claim 1 or 2 and further including illuminating means mounted in fixed alignment with the field of said viewing means to direct light upon only said visible portion of said map.

4. The invention according to claim 2 wherein said selectively operable means includes means establishing an axis about said predetermined axis to maintain the same visible portion of said map within the field of said viewing means.

5. The invention according to claim 4 wherein said axis of precession is at the center of said visible portion and said predetermined axis is at the center of said circular opening.

6. The invention according to claim 1 wherein said movable means comprises a first slide member mounted upon said base for movement relative thereto in a first linear direction perpendicular to said axis, and a second slide member mounted upon said first slide member for movement therewith in said first direction and relative thereto in a second linear direction, mutually perpendicular to both said axis and said first direction.

7. The invention according to claim 6 wherein said viewing means is carried upon said second slide member.

8. The invention according to claim 7 and further including first and second means for releasably locking the position of said first slide member relative to said base and to said slide member.

9. The invention according to claim 1 and further including a compass rose fixed with respect to said base and surrounding said holder for orientation thereof relative to said base and said movable means.

10. The invention according to claim 1 wherein said map holder comprises means for storing a film strip bearing a plurality of maps on successive frames thereof for selective positioning for viewing through said viewing means.

11. The invention according to claim 1, 2 or 6 and further including a transparent graticule carrying course indicting markings fixedly mounted upon said viewing means and visible therethrough in superposed relation to said visible portion of said map.

12. A self-contained map viewer and navigational aid unit comprising:

(a) a base member having a circular opening therein;
(b) a map holder with a map supported thereon;
(c) viewing means through which a portion of said map is visible;
(d) said map holder being rotatable about a predetermined axis with respect to said base;
(e) movable means upon which said viewing means is carried, said movable means being mounted for movement relative to said base linearly in any direction in a plane adjacent and parallel to said map to selectively change said visible portion; and (f) means selectively operable to fix the relative linear positions of said viewing means and said map as said map holder is rotated about said predetermined axis, thereby maintaining said visible portion of said map within the field of said viewing means.

13. The invention according to claim 12 and further including illuminating means mounted in fixed alignment with the field of said viewing means to direct light substantially only upon said visible portion of said map.

14. The invention according to claim 12 wherein said selectively operable means includes means establishing an axis about which said map holder precesses as it is rotated about said predetermined axis to maintain the same visible portion of said map within the field of said viewing means.

15. The invention according to claim 14 wherein said axis of precession is at the center of said visible portion of said map and said predetermined axis is at the center of said circular opening.

16. A self-contained map viewer and navigational aid unit comprising:

(a) a base member having a circular opening therein;
(b) a map holder with a map supported thereon;
(c) resilient detent means for releasably attaching said map holder to said base for rotation about a predetermined axis with said map positioned within said opening;
(d) viewing means through which a portion of said map is visible; and
(e) movable means upon which said viewing means is carried, said movable means being mounted for movement relative to said base linearly in any direction in a plane adjacent and parallel to said map to selectively change said visible portion.

17. The invention according to claim 6 wherein said detent means includes a resilient spring member.

18. A self-contained map viewer and navigational aid unit comprising:

(a) a base member a circular opening therein;
(b) a map holder with a map supported thereon;
(c) viewing means through which a portion of said map is visible;
(d) said map holder being rotatable about a predetermined axis with respect to said base;
(e) movable means upon which said viewing means is carried, said movable means being mounted for movement relative to said base linearly in any direction in a plane adjacent and parallel to said map to selectively change said visible portion;
(f) means selective operable to fix the relative linear positions of said viewing means and said map as said map holder is rotated about said predetermined axis, thereby maintaining said visible portion of said map within the field of said viewing means; and
(g) means selectively movable into and out of contact with a portion of said map holder to make a visible trace thereon when in contact therewith in response to relative movement of said viewing means and said map holder.

19. The invention according to claim 18 wherein said means to make a visible trace comprise a sharp pointer movable into light engagement with the surface of said map holder in superposed relation to said visible portion of said map, to permit relative movement of said viewing means and map holder while making a visible scribe line on said map holder surface.

* * * * *